(12) United States Patent
Mayell

(10) Patent No.: US 7,813,098 B2
(45) Date of Patent: Oct. 12, 2010

(54) METHOD AND APPARATUS FOR AN IN-RUSH CURRENT LIMITING CIRCUIT

(75) Inventor: Robert J. Mayell, San Francisco, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 12/429,756

(22) Filed: Apr. 24, 2009

(65) Prior Publication Data

US 2009/0201619 A1     Aug. 13, 2009

Related U.S. Application Data

(63) Continuation of application No. 11/393,026, filed on Mar. 30, 2006, now Pat. No. 7,535,691.

(51) Int. Cl.
    *H02H 9/02* (2006.01)
(52) U.S. Cl. .................... 361/93.9; 361/93.7
(58) Field of Classification Search ............. 361/93.1, 361/93.7–93.9; 327/427, 546
    See application file for complete search history.

(56) References Cited

U.S. PATENT DOCUMENTS

| | | | |
|---|---|---|---|
| 4,593,338 A | 6/1986 | Takeda et al. | |
| 5,079,455 A | 1/1992 | McCafferty et al. | |
| 6,137,329 A | 10/2000 | Kardash | |
| 6,335,654 B1 * | 1/2002 | Cole | 327/546 |
| 6,400,203 B1 | 6/2002 | Bezzi et al. | |
| 6,735,064 B2 | 5/2004 | Miyazaki | |

OTHER PUBLICATIONS

"Si 9910: Adaptive Power MOSFET Driver," Vishay Siliconix, Rev. F, Apr. 5, 1999, pp. 1-5.
"FDG901D: Slew Rate Control Driver IC for P-Channel MOSFETs," Fairchild Semiconductor Corporation, Rev. E, Apr. 2002, pp. 1-6.
"MAX5900/MAX5901: -100V, SOT23/TDFN, Simple Swapper Hot-Swap Controllers," Maxim Integrated Products, Rev. 4, Mar. 2005, pp. 1-14.
"ISL6115, ISL6116, ISL6117, ISL6120: Power Distribution Controllers," Intersil Corporation, Jan. 3, 2006, pp. 1-12.

* cited by examiner

*Primary Examiner*—Danny Nguyen
(74) *Attorney, Agent, or Firm*—Blakely Sokoloff Taylor & Zafman, LLP

(57) ABSTRACT

An in-rush current limiting circuit is disclosed. An apparatus according to aspects of the present invention includes a power switch having a first, second and third terminals. A capacitor having a first terminal and a second terminal is also included. The second terminal of the capacitor is coupled to the first terminal of a current source. The second terminal of the current source is coupled to a second input terminal of the in-rush current limit circuit. A power switch is also included. The first terminal of the power switch is coupled to the anode of a diode. The cathode of the diode is connected to the first terminal of the current source. The second terminal of the power switch is coupled to a second input terminal of the in-rush current limit circuit. The third terminal of the power switch is coupled to be responsive to a voltage across the current source circuit in response to a rate of change of voltage between first and second terminals of the power switch.

16 Claims, 3 Drawing Sheets

METHOD AND APPARATUS FOR AN IN-RUSH CURRENT LIMITING CIRCUIT

REFERENCE TO RELATED APPLICATION

The present application is a continuation of U.S. patent application Ser. No. 11/393,026, filed Mar. 30, 2006, now pending, entitled "METHOD AND APPARATUS FOR AN IN-RUSH CURRENT LIMITING CIRCUIT," which is hereby incorporated by reference.

BACKGROUND OF THE INVENTION

1. Field of the Invention

The present invention relates generally to in-rush current limiting circuits, and more specifically, the present invention relates to low dissipation in-rush current limiting circuits.

2. Background Information

In certain applications of electronic circuits, it is desirable to control the in-rush current that flows into a circuit when a supply voltage is applied. Examples of such applications are in DC-DC conversion (or rectified AC) applications where a power conversion unit is connected to a DC source (or rectified AC) supply and where the power conversion unit includes a large capacitor at the input to the power converter. The in-rush current limiting circuit function is to regulate the current drawn from a power source providing the DC supply voltage to the power converter circuit. Without the use of an in-rush current limiting circuit, the current that charges the input capacitor of the power converter would be uncontrolled leading to a very high in-rush current potentially causing damage to connectors and other components of the power converter and power source equipment.

Applications for in-rush current limiting circuits are normally required to operate at high efficiency and therefore any in-rush current limiting circuit configuration allowing improved efficiency is highly desirable.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Examples of apparatuses and methods for implementing an in-rush current limiting circuit are disclosed. In the following description, numerous specific details are set forth in order to provide a thorough understanding of the present invention. It will be apparent, however, to one having ordinary skill in the art that the specific detail need not be employed to practice the present invention. Well-known methods related to the implementation have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures or characteristics may be combined for example into any suitable combinations and/or sub-combinations in one or more embodiments.

An improved in-rush current limiting circuit and method for implementing such a circuit in accordance with the teachings of the present invention will now be described. Examples of the present invention involve methods and apparatuses to simplify and improve an in-rush current limiting circuit such that no current sensing element is required and the limiting of in-rush current is performed by controlling the rate of change of a voltage across the drain and source terminals of a power switch, which may also be referred to as controlling the slew-rate of the voltage across a power switch in accordance with the teachings of the present invention.

Figure 1:
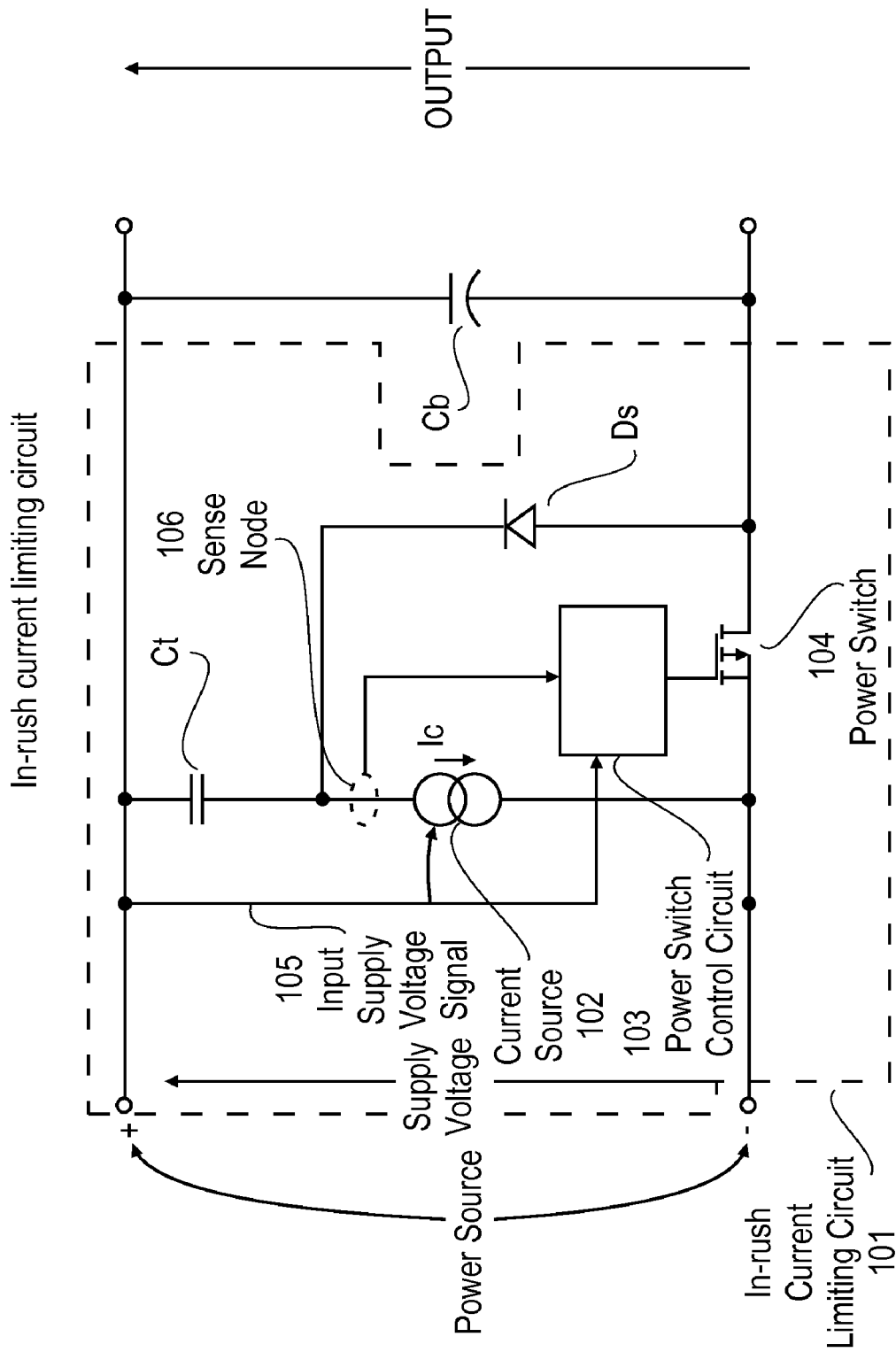
FIG. 1 is a block diagram illustrating generally an example of an in-rush current limit circuit in accordance with the teachings of the present invention.

To illustrate, FIG. 1 shows generally a block diagram of one example of an in-rush current limiting circuit 101 in accordance with the teachings of the present invention. As shown, in-rush current limiting circuit 101 includes a power switch 104 coupled to a capacitor Ct, which is coupled to a current source 102 and a diode Ds, coupled to the power switch 104. The current source 102 is coupled to an input terminal of the in-rush current limiting circuit 101 and the power switch 104 is also coupled to the same input terminal of the in-rush current limiting circuit 101. In the illustrated example, the gate terminal of power switch 104 is coupled to power switch control circuit 103, which is coupled to receive an input supply voltage 105 from one of the input terminals and a signal from a sense node 106 between current source 102 and capacitor Ct. The anode of diode Ds, is coupled to the Drain of the power switch 104 and the cathode of diode Ds is coupled to the capacitor Ct and current source 102.

As will be discussed, the gate terminal of power switch 104 is coupled to be responsive to the voltage across the current source 102 and in response to a rate of change of voltage across the power switch 104 via power switch control circuit 103 in accordance with the teachings of the present invention. In one example, this is achieved with the signal applied to the gate terminal of the power switch 104 from power switch control circuit 103 being responsive to the voltage across the current source and in response to a change in a voltage across the power switch 104 in accordance with the teachings of the present invention.

To illustrate, the in-rush current limiting circuit 101 is coupled to receive a direct current (DC) supply voltage from a power source coupled between the input terminals of the in-rush current limiting circuit 101. The circuit of FIG. 1 employs the power switch control circuit 103 that receives the input supply voltage signal 105, which may be used to determine an input supply voltage threshold voltage at which the turn on of a power switch 104 and turn on of current source 102 are initiated. The power switch 104 and current source 102 are therefore off until a threshold value of the input supply voltage signal 105 is reached.

When the supply voltage is first applied to the in-rush current limiting circuit 101 of FIG. 1, and until threshold value of the input supply voltage signal 105 is reached, the supply voltage is substantially all dropped across the drain-source terminals of the power switch 104. When the current source 102 turns on, it allows diode Ds to conduct. The anode of the diode Ds is at the voltage of the power-switch Drain terminal. The cathode of diode Ds is one diode drop below the power-switch Drain terminal voltage, when the current source 102 is operating. When the power switch control circuit 103 starts to turn on the power switch 104, the drain-source voltage across the power switch 104 begins to fall. The cathode of diode Ds maintains one diode drop below the value of the power switch 104 Drain terminal. This change in voltage across power switch 104 from the drain terminal to the source terminal of power switch 104 is thereby coupled via diode Ds to creates a current flow in capacitor Ct.

The change in voltage on the capacitor Ct is coupled to the power switch control circuit 103 via the sense node 106 between current source 102 and capacitor Ct to the power switch control circuit 103. The power switch control circuit 103 then controls a gate drive to the power switch 104 to regulate the rate of voltage change in capacitor Ct thus limiting the voltage slew rate across the power switch 104 and therefore also the in-rush current flowing in output bulk capacitor Cb in accordance with the teachings of the present invention.

It is appreciated that a resistor can be used to replace current source 102. The use of a controlled current Ic provided by current source 102, however, has advantages over using a simple resistor in place of current source 102, since the current source 102 current Ic is insensitive to the value of the supply voltage and can be made insensitive to temperature effects that could otherwise influence the value of current flowing in Ct at which the sense node 106 generates a signal that the power switch control circuit 103 can detect in order to regulate the flow of current in capacitor Ct. The use of a current source 102 also allows accurate control of the slew-rate of the drain of the power switch 104. It is appreciated that in another example, the metal oxide semiconductor field effect transistor (MOSFET) power switch 104 of FIG. 1 could be replaced by a bipolar transistor in accordance with the teachings of the present invention.

Figure 2:
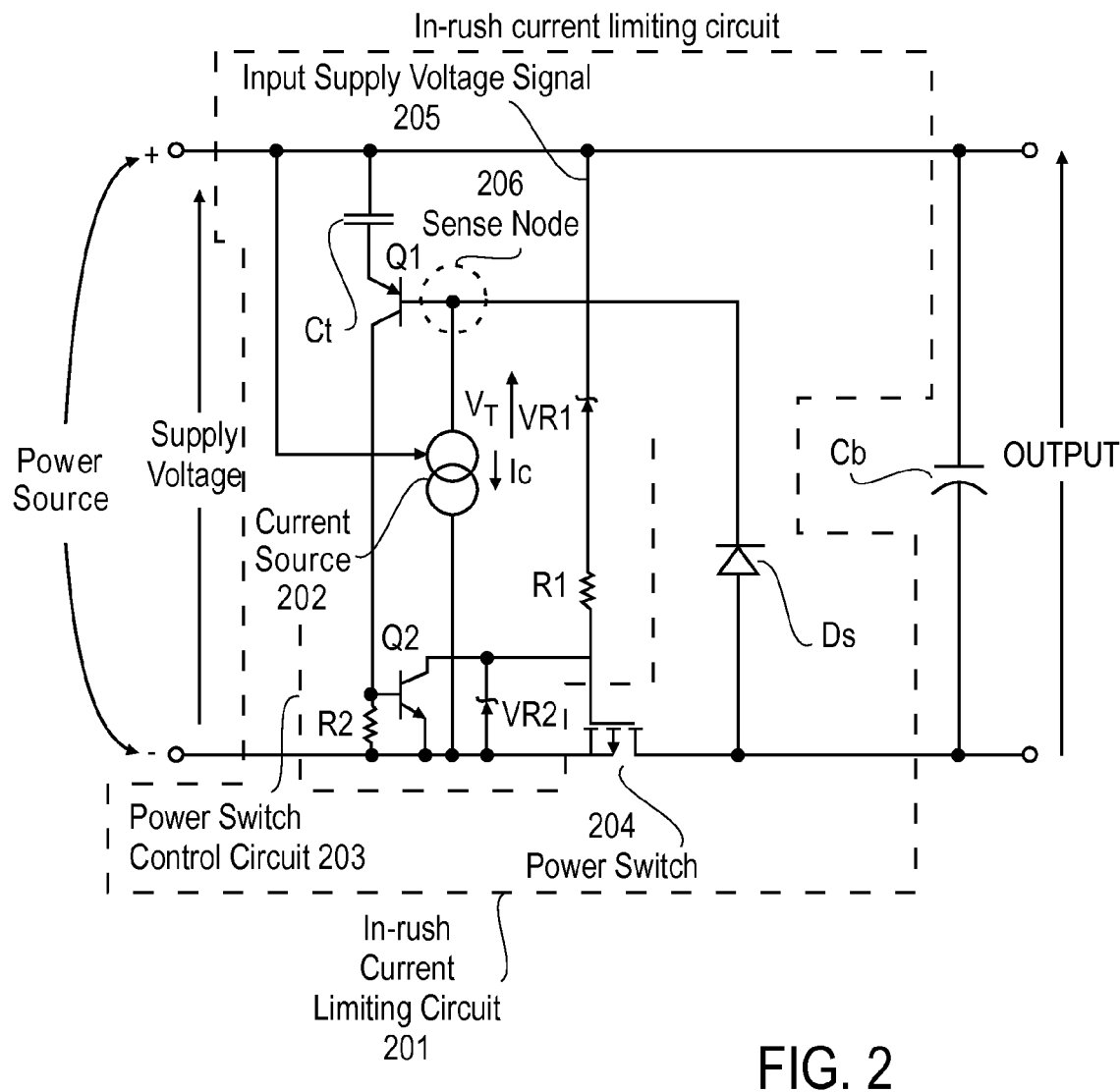
FIG. 2 is a schematic diagram illustrating generally an example of an in-rush current limit circuit in accordance with the teachings of the present invention.

FIG. 2 shows generally a schematic of an example in-rush current limiting circuit 201 in accordance with the teachings of the present invention. As can be observed, it is noted that example in-rush current limiting circuit 201 of FIG. 2 shares some similarities with the example in-rush current limiting circuit 101 of FIG. 1. In the example shown in FIG. 2, the elements of the power switch control circuit 203 are shown in more detail. As shown, Zener diode VR1 is coupled to receive the input supply voltage signal 205. In the illustrated example, the Zener diode VR1 Zener voltage $V_T$ determines a threshold value of the input supply voltage from the power source at which the power switch 204 and current source 202 start to turn on.

In the example shown in FIG. 2, the sense node 206 is coupled to the base of transistor Q1. The emitter of transistor Q1 is coupled to a capacitor Ct. The cathode of diode Ds maintains one diode drop below the value of the power switch 204 Drain terminal. A change in voltage across power switch 204 from the drain terminal to the source terminal of power switch 204 is thereby coupled via diode Ds. The base of transistor Q1 is coupled to the current source 202 and diode cathode Ds. When the drain voltage of the power switch 204 lowers, so also does the voltage on the base of transistor Q1, thereby turning it on. Transistor Q1 conducts the current charging Ct which also flows through resistor R2 thereby driving a voltage. When the voltage across resistor R2 reaches the base emitter threshold voltage of transistor Q2, transistor Q2 turns on, which pulls the gate voltage of the power switch 204 down, which tends to turn the power switch 204 off.

In the illustrated example, the following equations apply:

$$I_{IN} = C_b \cdot \frac{\Delta V_{C_B}}{\Delta t} \quad \text{(Equation 1)}$$

$$I_{IN} = C_b \cdot \frac{\Delta V_{POWER-SWITCH\ (DRAIN)}}{\Delta t} \quad \text{(Equation 1)}$$

$$I_{IN} = \frac{C_b}{C_t} \cdot \frac{\Delta V_{Q2(be)}}{R_2} \quad \text{(Equation 2)}$$

Equation 1 calculates the in-rush current as a function of bulk-capacitor Cb and the rate of change of bulk-capacitor voltage. Equation 2 shows that in-rush current can also be expressed as function of the slew-rate or rate of change of power switch drain voltage. Equation 3 shows that in-rush current can also be expressed as function of bulk capacitor Cb, capacitor Ct, and the base-emitter voltage drop of transistor Q2 along with the value resistor R2.

The gate drive of the power switch 204 is therefore responsive to a signal at the sense node 206, the sense node 206 being the node coupling capacitor Ct to current source 202. The gate drive of the power switch 204 is therefore also responsive to the change in voltage across the current source 202 since it is this signal that is applied to the base of transistor Q1 and thereby also couples to drive resistor R2 and transistor Q2. Zener diode VR2 limits the gate voltage of the power switch 204 after the in-rush function has been completed and the power switch 204 drain-source voltage has reached a steady state value determined by the on resistance of the power switch 204 and the rate of change of the drain-source voltage of the power switch 204 is substantially zero.

Figure 3:
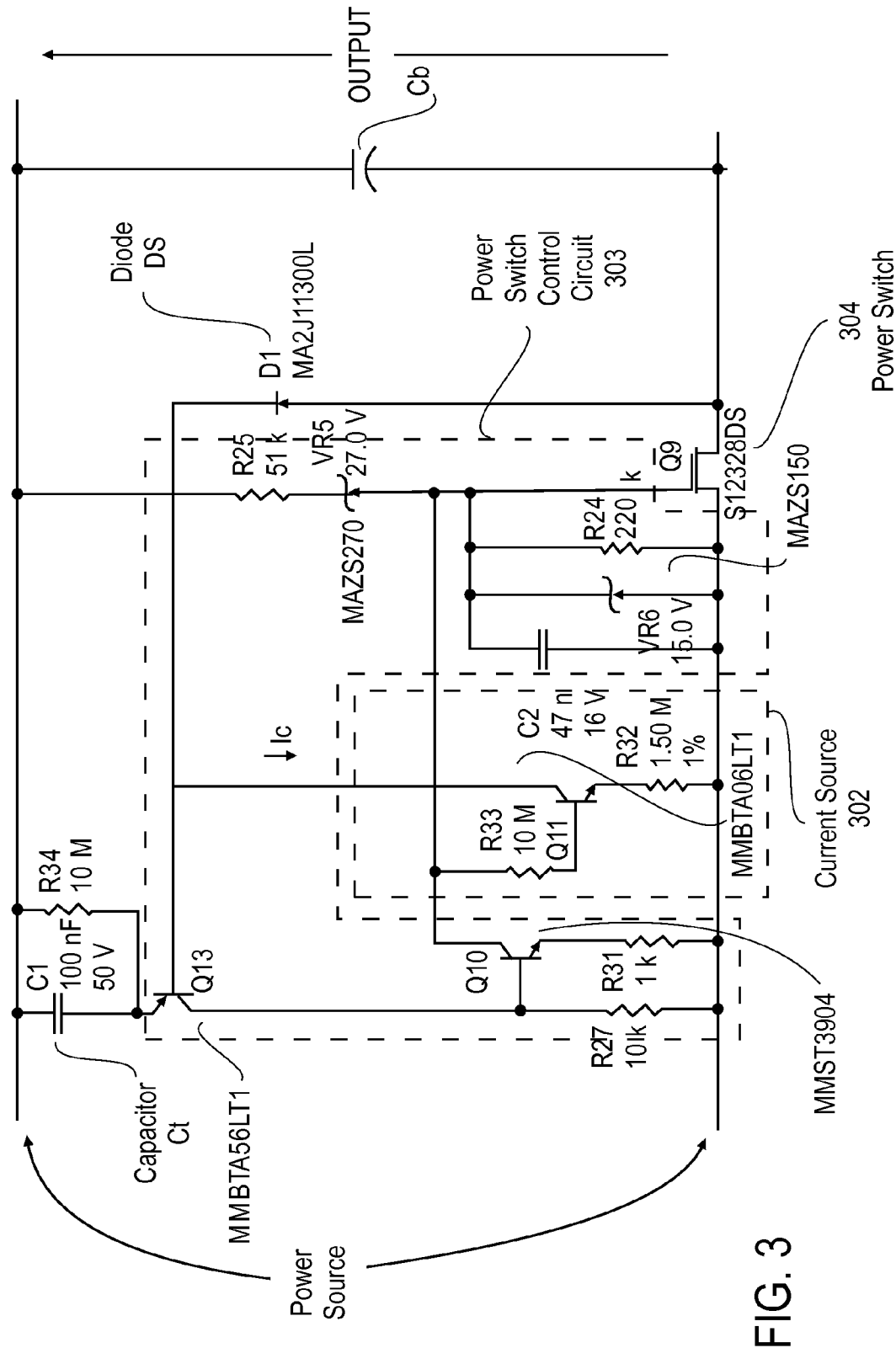
FIG. 3 is a schematic diagram illustrating generally another example of an in-rush current limit circuit benefiting from the teachings of the present invention.

FIG. 3 shows generally schematic of another example in-rush current limiting circuit 301 in accordance with the teachings of the present invention. As can be observed, it is noted that example in-rush current limiting circuit 301 of FIG. 3 shares some similarities with the example in-rush current limiting circuit 201 of FIG. 2 and/or in-rush current limiting circuit 101 of FIG. 1. In the example shown in FIG. 3, the Zener diode VR5 conducts when the input supply voltage signal 305 voltage exceeds approximately 27V. This generates a voltage across resistor R24 driving the gate of the power switch 304 MOSFET Q9 and activating the current source 302. When the gate voltage reaches the power switch 304 MOSFET Q9 turn-on threshold, power switch 304 and current source 302 will start to turn-on.

In turning on, the power switch 304 drain voltage will start to fall below the supply voltage potential. This fall in power switch 304 drain is coupled to the cathode of diode Ds. The fall in potential turns on transistor Q13 and Q13 conducts charge current from capacitor C1 to the resistor R27. It is noted that capacitor C1 is equivalent to capacitor Ct in FIGS. 1 and 2. It is also noted that the current source formed by R32, R33 and Q11 is equivalent to current sources 102 or 202 of FIGS. 1 and 2, and is only one example of a current source circuit which may be employed in accordance with the teachings of the present invention. In other examples, the current source formed by R32, R33 and Q11 could be replaced with another suitable type of current source (e.g. including a simple resistor) in accordance with the teachings of the present invention.

In the example illustrated in FIG. 3, the current source R32, R33 and Q11 maintains voltage on the cathode of diode D1 at one diode drop below the voltage of the drain of the power switch Q9. As the power switch Q9 turns on, the drain voltage of the power switch Q9 will lower and thereby lowering the cathode of diode D1 and the base of transistor Q13 at sense node 306, turning transistor Q13 on. The sense node 306 signal is therefore responsive to the voltage across the current source formed by R32, R33 and Q11. The transistor Q13 conducts charge current from capacitor C1 and generates a voltage signal across the lower resistor R27. The voltage signal across R27 drives the base of transistor Q10 causing it to conduct, thus pulling down on the gate of the power switch 304 MOSFET Q9 tending to turn power switch 304 off.

In the illustrated example, a constant charge current flowing in capacitor C1 and through resistor R27 is proportional to a constant rate of change in the power switch 304 MOSFET Q9 drain voltage, which is the drain voltage slew-rate of power switch 304. Hence, by controlling the capacitor C1 charge current through resistor R27, the drain-voltage slew-rate of power switch 304 is also controlled. Also the diode Ds in conjunction with current source 302 allows the cathode of diode Ds to follow the voltage potential of the power switch 304 drain. Thus a closed loop system is completed such that the control terminal signal, or gate drive signal, applied to power switch 304 MOSFET Q9 is responsive to a sense node 306 signal, which is in turn responsive to the voltage across the current source terminals, formed by the emitter and collector terminals of transistor Q13, while the drain-source voltage across power switch 304 MOSFET Q9 is changing, effectively controlling the turn-on slew rate of power switch 304 MOSFET Q9. In turn, the control of the power switch 304 MOSFET Q9 drain-source voltage slew rate controls the in-rush current flowing into bulk capacitor Cb.

The slew rate of power switch 304 MOSFET Q9 can be controlled by changing the value of capacitor C1 or by changing the value of R27. An advantage of this example is that it does not require direct sensing of the current through power switch 304 MOSFET Q9 and therefore avoids the associated losses and cost, that would be incurred by using a current sense resistor or other direct means of sensing in-rush current. The fact that a current source, rather than a simple resistor, is coupled between capacitor C1 and the input supply voltage terminal of the in-rush current limiting circuit 301 provides a stable current ensuring that the signal generated at the sense node 306 is insensitive to temperature and input supply voltage variations in accordance with the teachings of the present invention.

In the foregoing detailed description, the method and apparatus of the present invention have been described with reference to a specific exemplary embodiment thereof. It will, however, be evident that various modifications and changes may be made thereto without departing from the broader spirit and scope of the present invention. The present specification and figures are accordingly to be regarded as illustrative rather than restrictive.

What is claimed is:

1. A method of in-rush current limiting, comprising:
    receiving an input supply voltage signal from a power source coupled between input terminals of an in-rush current limiting circuit;
    initiating a turn on of a power switch included in the in-rush current limiting circuit in response to the input supply voltage signal reaching a threshold voltage;
    initiating a turn on of a current source included in the in-rush current limiting circuit in response to the input supply voltage signal reaching the threshold voltage;
    creating a current flow through a capacitor included in the in-rush current limiting circuit in response to a voltage across the current source; and
    controlling a gate drive to the power switch in response to the current flow through the capacitor to limit a voltage slew rate across the power switch.

2. The method of claim 1, wherein creating the current flow through the capacitor further comprises conducting a current through a diode included in the in-rush current limiting circuit in response to the current source turning on.

3. The method of claim 2, wherein the diode has an anode and a cathode and wherein the anode of the diode coupled to a drain terminal of the power switch.

4. The method of claim 2, wherein creating the current flow through the capacitor further comprises maintaining a voltage at a cathode of the diode such that the voltage at the cathode is one diode drop below a voltage at a drain terminal of the power switch.

5. The method of claim 1, wherein creating the current flow through the capacitor further comprises creating the current flow through the capacitor such that the current flow is responsive to a rate of change of voltage between a drain and a source terminal of the power switch.

6. The method of claim 1, wherein creating the current flow through the capacitor further comprises creating the current flow through the capacitor such that the current flow is proportional to a rate of change of voltage between a drain and a source terminal of the power switch.

7. The method of claim 1, further comprising determining the threshold voltage with a zener diode coupled between one of the input terminals and a gate terminal of the power switch.

8. The method of claim 1, wherein controlling the gate drive to the power switch comprises pulling down a voltage on a gate terminal of the power switch in response to the current flow through the capacitor.

9. The method of claim 8, wherein pulling down the voltage on the gate terminal of the power switch tends to turn off the power switch.

10. The method of claim 1, wherein the in-rush current limiting circuit further includes a transistor, and wherein controlling the gate drive to the power switch comprises:
    generating a voltage signal with the current flow through the capacitor; and
    causing the transistor to conduct in response to the voltage signal.

11. The method of claim 10, wherein the in-rush current limiting circuit further includes a resistor, wherein generating the voltage signal comprises generating the voltage signal across the resistor with the current flow through the capacitor.

12. The method of claim 1, wherein the power switch has a first terminal, a second terminal and a third terminal, wherein a terminal of the capacitor is coupled to one of the input terminals of the in-rush current limiting circuit, and wherein a terminal of the current source circuit is coupled to the second terminal of the power switch and to another of the input terminals of the in-rush current limiting circuit.

13. The method of claim 1, wherein the power switch is a metal oxide field effect transistor (MOSFET).

14. The method of claim 1, wherein the power switch is a bipolar transistor.

15. The method of claim 1, wherein the in-rush current limiting circuit is coupled to a bulk capacitor such that an in-rush current flowing in the bulk capacitor is limited.

16. The method of claim 15, wherein a first terminal of the bulk capacitor is coupled to one of the input terminals of the in-rush current limiting circuit and a second terminal of the bulk capacitor is coupled to a drain terminal of the power switch.

* * * * *